US006892710B2

(12) United States Patent
Ekstam

(10) Patent No.: US 6,892,710 B2
(45) Date of Patent: May 17, 2005

(54) FUEL/AIR SEPARATION SYSTEM

(76) Inventor: Charles Bradley Ekstam, 905 Camelot Acres Dr., Villa Ridge, MO (US) 63089

( * ) Notice: Subject to any disclaimer, the term of this patent is extended or adjusted under 35 U.S.C. 154(b) by 0 days.

(21) Appl. No.: 10/783,055

(22) Filed: Feb. 20, 2004

(65) Prior Publication Data

US 2004/0226542 A1 Nov. 18, 2004

Related U.S. Application Data

(60) Provisional application No. 60/449,518, filed on Feb. 21, 2003.

(51) Int. Cl.$^7$ ............................................. F02M 55/02
(52) U.S. Cl. ....................... 123/514; 124/516
(58) Field of Search .................. 123/514, 516

(56) References Cited

U.S. PATENT DOCUMENTS

| | | |
|---|---|---|
| 1,269,787 A | 6/1918 | Church |
| 2,222,274 A | 11/1940 | Antonsen |
| 3,488,926 A | 1/1970 | Gilman |
| 3,631,654 A | 1/1972 | Riely |
| 3,775,947 A | 12/1973 | Dupont et al. |
| 3,969,092 A | 7/1976 | Huffman et al. |
| 4,017,397 A | 4/1977 | Copeland |
| 4,041,569 A | 8/1977 | Petersen |
| 4,093,428 A | 6/1978 | Swogger |
| 4,179,372 A | 12/1979 | Rosaen |
| 4,330,306 A | 5/1982 | Salant |
| 4,372,847 A | 2/1983 | Lewis |
| 4,411,239 A | 10/1983 | Kelch |
| 4,424,128 A | 1/1984 | Shinaver |
| 4,454,848 A | 6/1984 | Duprez |
| 4,484,936 A | 11/1984 | Sakai |
| 4,487,618 A | 12/1984 | Mann |
| 4,502,954 A | 3/1985 | Druffel |
| 4,512,882 A | 4/1985 | Fischer et al. |
| 4,512,884 A | 4/1985 | Wheatley |
| 4,529,512 A | 7/1985 | Williamson et al. |
| 4,539,965 A | 9/1985 | Soltau |
| 4,543,938 A | 10/1985 | Szlaga |
| 4,615,694 A | 10/1986 | Raines |
| 4,683,055 A | 7/1987 | Bosch et al. |
| 4,732,671 A | 3/1988 | Thornton et al. |
| 4,746,430 A | 5/1988 | Cooley |
| 4,763,684 A | 8/1988 | Kelch |
| 4,828,587 A | 5/1989 | Baurmeister et al. |
| 4,933,093 A | 6/1990 | Keller |
| 4,976,754 A | 12/1990 | Edelstein et al. |
| 4,979,482 A | 12/1990 | Bartlett |
| 4,997,555 A | 3/1991 | Church et al. |
| 5,095,880 A | 3/1992 | Ricks |
| 5,207,898 A | 5/1993 | Hodgkins |
| 5,264,121 A | 11/1993 | Guzman-Sanchez |
| 5,355,860 A | 10/1994 | Ekstam |
| 5,598,827 A * | 2/1997 | Kato .......................... 123/518 |
| 5,746,184 A | 5/1998 | Ekstam |
| 6,718,953 B1 * | 4/2004 | Torgerud .................... 123/516 |
| 6,729,310 B2 | 5/2004 | Ekstam |
| 2002/0170545 A1 | 11/2002 | Ekstam |
| 2004/0011338 A1 | 1/2004 | Ekstam |

FOREIGN PATENT DOCUMENTS

| | | |
|---|---|---|
| GB | 2140091 A | 11/1984 |
| JP | 58210355 | 12/1983 |
| JP | 60164657 | 8/1985 |
| JP | 62282162 | 12/1987 |

OTHER PUBLICATIONS

Cummins Service Topics, "Throwaway Fuel Filter Operating Fuel Levels" dated Jul. 1, 1965.

* cited by examiner

*Primary Examiner*—Thomas Moulis
(74) *Attorney, Agent, or Firm*—Chase Law Firm, L.C.

(57) ABSTRACT

A fuel/air separation apparatus for separating air and/or vapor from a liquid fuel. The apparatus includes a canister and filter element which separates the entrained air and/or vapor from the fuel and provides substantially air/vapor-free fuel for use by an engine and returns the filtered air/vapor and any excess fuel to the vehicle's fuel tank.

6 Claims, 2 Drawing Sheets

FUEL/AIR SEPARATION SYSTEM

CROSS-REFERENCE TO RELATED APPLICATION

This application claims the benefit of a prior filed, co-pending application Ser. No. 60/449,518, filed Feb. 21, 2003, entitled FUEL/AIR SEPARATION SYSTEM.

BACKGROUND OF THE INVENTION

This invention relates to an apparatus for removing entrained gas from a liquid and, more particularly, to a fuel/air separation apparatus to remove entrained particle contaminants, air and vapor from a liquid.

Today's internal combustion engines typically utilize a fuel injection type system to inject fuel into the engine cylinder. The fuel is delivered to the cylinder in precise quantity of air. The ratio of air/fuel mixture is tightly controlled in order to maintain a smooth and efficient running engine. If air or other gaseous vapor is entrained with the fuel and injected into the cylinder, the air/fuel ratio may be affected resulting in a rough running engine and loss of power and efficiency. Air and/or vapor in a fuel injector delays injection of fuel into the cylinder retarding the engine timing. Additionally, additional air or vapor may lower the cylinder air pressure resulting in the cylinder rings not tightly seating against the cylinder wall and allowing blow-by and increasing vehicle exhaust emissions.

SUMMARY OF THE INVENTION

A fuel/air separation apparatus is provided which separates entrained air/vapor from fuel. The apparatus includes a canister and filter element which separates the fuel from entrained air/vapor bubbles and provide separate paths for substantially air/vapor-free fuel to go to the vehicle's engine and the air/vapor and any excess fuel to return to the vehicle's fuel tank.

DETAILED DESCRIPTION

Figure 1:
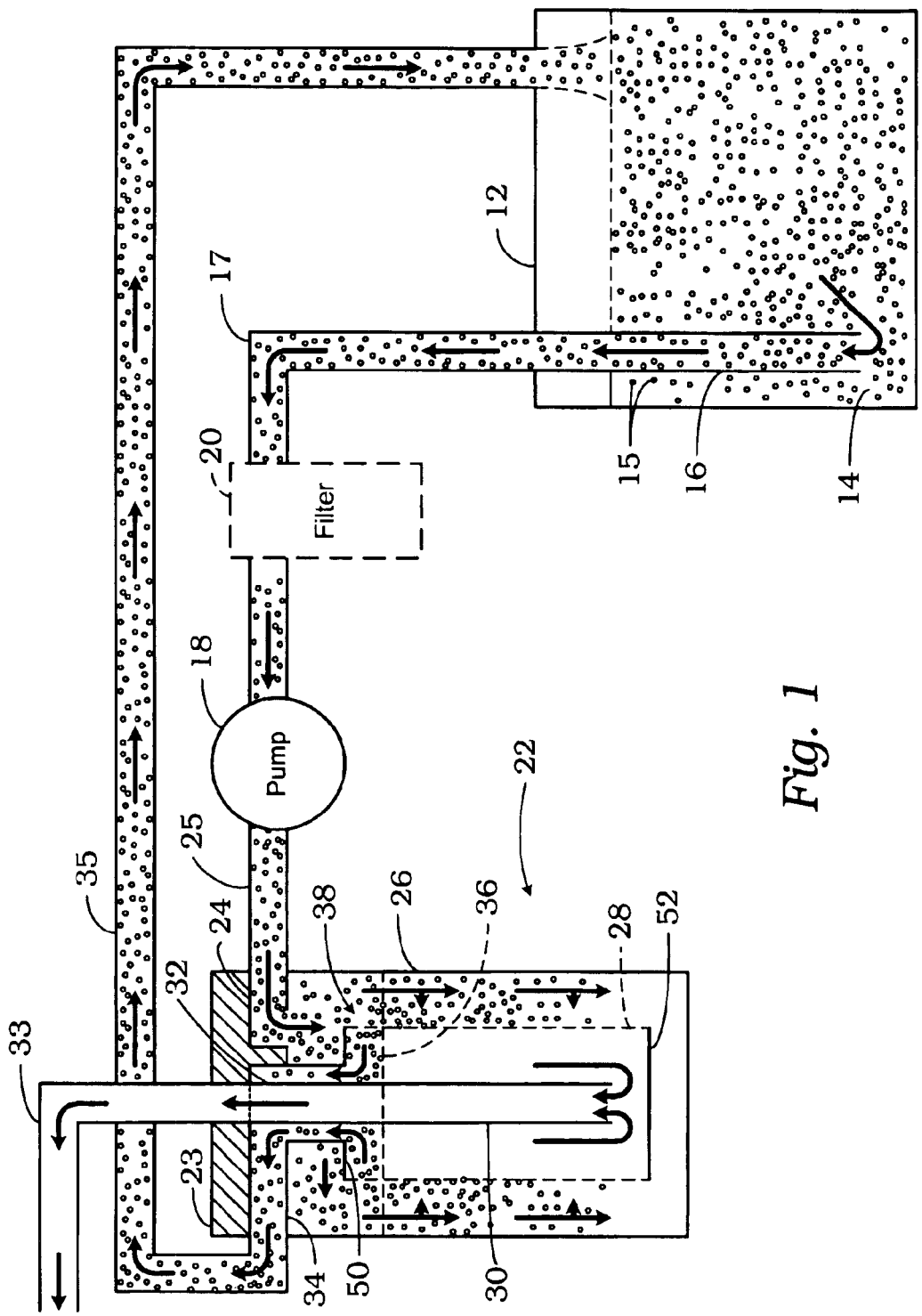
FIG. 1 is a diagrammatic sectional view of a fuel system utilizing a fuel/air separation apparatus of the present invention

Referring to FIG. 1, an illustration of a fuel system for use in a vehicle (not shown) is generally indicated by reference numeral 10. The fuel system 10 includes a fuel tank 12 for storing fuel 14, and a fuel intake 16 to draw fuel 14 from tank 12 under a vacuum from pump 18. The input of pump 18 is connected to an optional fuel filter or water separator 20 to separate out particle contaminants such as dirt and rust particles and/or water from the fuel 14. The output of pump 18 is connected to fuel/air separation apparatus 22.

Fuel/air separation apparatus 22 includes an inlet port 24, a hallow canister 26, a filter element 28, a draw tube 30, a fuel port 32 and an air/vapor/fuel return port 34.

Fuel 14 in tank 12 includes air and vapor bubbles 15 mixed with the fuel 14. As the fuel 14 is drawn into the fuel intake tube 16, the entrained air/vapor bubbles 15 are carried along with the fuel 14 into the fuel line 17. Fuel 14 in line 17 may also include other debris such as dirt and rust particles and water (not shown).

Figure 2:
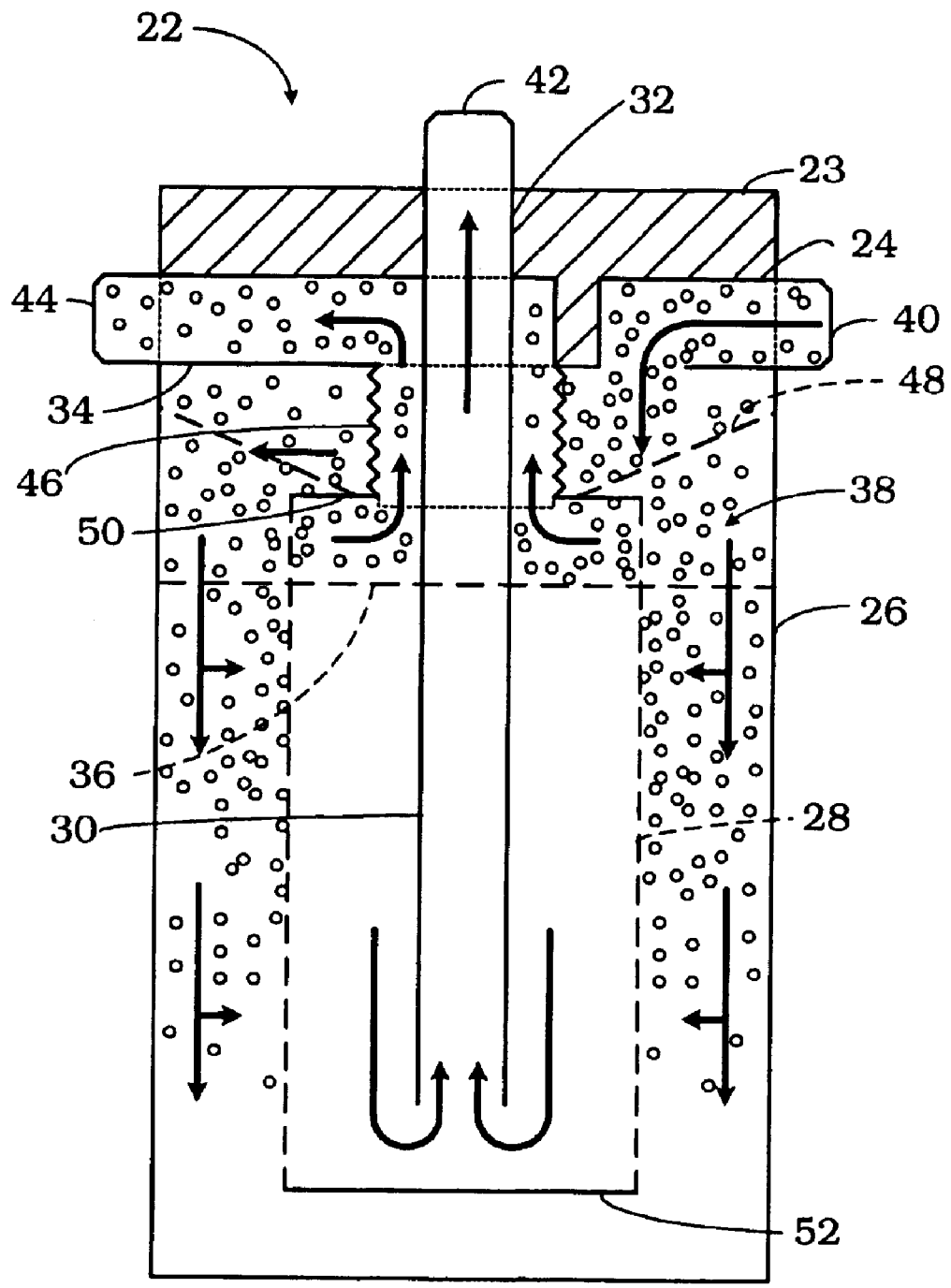
FIG. 2 is an enlarged sectional view of the fuel/air separation apparatus of FIG. 1.

Referring to FIGS. 1 and 2, the fuel 14 and entrained air/vapor bubbles 15 travel through pump 18 and filter/water separator 20. The fuel 14 with entrained air/vapor bubbles 15 enters fuel/air separation apparatus 22 through inlet port 24 under pressure from pump 18. The fuel 14 and entrained air/vapor bubbles 15 are directed into canister 26 at the outer diameter of filter 28. Filter 28 is a conventional pleated paper fuel filter, for example.

At this point, the filter 28 allows the fuel 14 to pass while at the same time providing resistance to the air/vapor 15 passage through the filter media. As the fuel passes through filter 28, it enters draw tube 30 and continues onto the outlet port 32 to the vehicle's engine (not shown) with substantially no entrained air/vapor. If the fuel demand of the engine is less than the fuel provided by pump 18, the excess fuel returns to the tank 12 through the return port 34 and return line 35. Air/vapor bubbles 15 rise to the highest point in canister 26 and collect.

When an equilibrium point is reached where the pressure differential across the filter 28 is equal to the wetted paper resistance to air/vapor passage, air or vapor collected at the top of canister 26, shown as the area above broken line 36, passes through the top portion of filter 28, generally indicated by reference number 38. The air/vapor that has passed through filter 28 is immediately passed through return port 34 along with any excess fuel and returns to tank 12. In this manner, any dirt or rust particles are removed by filter 28 before the fuel and/or air/vapor are returned to the tank 12.

Fuel/air separation apparatus 22 includes a base 23 which is machined from aluminum stock or other suitable material. The base 23 has an inlet port 24, an outlet port 32 and a return port 34. A threaded inlet fitting 40 is threadably inserted into inlet portion 24 in base 23. Inlet fitting 40 provides a coupling to inlet line 25. A threaded outlet fitting 42 is threadably inserted into outlet port 32 and provides a coupling to outlet line 33. A threaded return fitting 44 is threadably inserted into return port 34 and provides a coupling to return line 35.

Draw tube 30 has a threaded upper portion that is inserted into the outlet port 32 opposite the outlet fitting 42. Draw tube 30 passes through a threaded filter media receiver 46 which is in communication with return port 34. The threaded media receiver 46 is sized to allow free-flow of fuel 14 and air/vapor 15 that has passed through filter element 28 around the upper portion of draw tube 30 to return port 34.

Canister 26 includes a filter element 28 which is generally centered within canister 26 and secured with support structure 48. Support structure 48 is perforated or has spaced-apart ribs to allow free flow of fuel 14 around filter element 28. Filter element 28 may be a common prior art cylindrical filter element which includes upper 50 and lower 52 retaining plates to provide structure and shape to the filter media of filter 28. The upper retaining plate 50 includes a threaded aperture generally centered in plate 50 which is sized to engage threaded filter media receiver 46. Filter element 28 includes a cavity (not shown) to receive draw tube 30. Canister 26 is similar to a spin-on type oil or fuel filter.

Fuel 14 in tank 12 includes air and vapor bubbles 15 due to the fuel 14 sloshing about and the vacuum from fuel pump 18. Fuel pump 18 draws the air and vapor bubbles 15 into the fuel intake tube 16 where they become entrained with fuel 14. The fuel 14 and air/vapor 15 mixture travels through the optional fuel filter/water separator 20 and through pump 18 to the inlet line 25 coupled to inlet fitting 40. The fuel 14 and air/vapor 15 mixture continues through the inlet port 24 into the canister 26 surrounding filter element 28. Filter element 28 dislodges the air/vapor bubbles 15 from the fuel 14 which passes through the filter element 28 and into draw tube 30. The substantially air/vapor-free fuel 14 passes up through draw tube 30 through outlet port 32 and outlet fitting 42 to outlet line 33 and on to the vehicle engine (not shown).

If the fuel needs of the engine are less than the output of pump 18, then the excess fuel 14 which passes through filter element 28 is forced through filter media receiver 46 coupled to return port 34 and fitting 44, through return line 35 and back to the tank 12. Clean, filtered fuel is returned to tank 12.

Air/vapor bubbles 15 which are dislodged from fuel 14 on the outside of filter 28 rise to the top of canister 26 and accumulate. Once an equilibrium point is reached where the pressure differential across the filter media 28 is greater than or equal to the wetted filter media resistance to air/vapor passage, the air/vapor that has accumulated at the top of canister 26 is forced through the upper portion of filter media 28 near the top plate 50. The air/vapor 15 that has passed through filter 28 immediately escapes through filter media receiver 46 and back to tank 12 through return line 35. Clean, filtered air, vapor and fuel is returned to tank 12.

It should be understood that application of the present invention is not limited to removal of air/vapor from fuel but may be adapted by one skilled in the art to remove entrained air/vapor/gas from any liquid.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. An apparatus for separating entrained air and/or vapor from a liquid fuel comprising:

a base having an inlet port for receiving said fuel, an outlet port and a return port;

a filter element having an interior chamber in fluidic communication with said outlet port and said return port;

a draw tube in fluidic communication with said outlet port and extending to a lower area within said interior chamber of said filter element; and a canister secured to said base and surrounding said filter element in fluidic communication with said inlet port;

wherein fuel with entrained air and/or vapor enters said inlet port of said base and said air and/or vapor separates from said fuel and accumulates at the top of said canister, said air and/or vapor passes through an upper portion of said filter element and exits through said return port in said base, said fuel passes through said filter element and exits through said draw tube to said outlet port.

2. The apparatus as set forth in claim 1 wherein a portion of said fuel passing through said filter element exits through said return port.

3. The apparatus as set forth in claim 1 wherein said filter element is mounted within said canister.

4. The apparatus as set forth in claim 1 wherein said filter element is generally cylindrically shaped.

5. The apparatus as set forth in claim 1 wherein said filter element is a paper filter.

6. An apparatus for separating entrained air and/or vapor from a liquid fuel comprising:

a base having an inlet port for receiving said fuel under pressure from a fuel tank, an outlet port for delivering said fuel to an engine, and a return port for returning said air and/or vapor to said fuel tank, a generally hollow canister having a filter element secured with said canister, said filter element presenting an inlet area and an outlet area and having an upper portion and a lower portion, said canister mounted to said base wherein said inlet area of said canister is in fluidic communication with said inlet port of said base, and said outlet portion is in fluidic communication with said outlet port and said return port of said base, and a generally hollow draw tube in fluidic communication with outlet port and extending to said lower portion of said filter element within said outlet area, wherein fuel with entrained air and/or vapor enters said inlet port of said base and said air and/or vapor separates from said fuel and accumulates at said upper portion of said filter element, said air and/or vapor passes through said upper portion of said filter element from said inlet area to said outlet area and exits through said return port in said base, said fuel passes through said filter element from said inlet area to said outlet area, enters said draw tube and exits through said outlet portion of said base.

* * * * *